United States Patent
Chapman et al.

(10) Patent No.: US 11,073,824 B1
(45) Date of Patent: Jul. 27, 2021

(54) SYSTEM AND METHOD OF SIMULATING AND OPTIMIZING SURFACE QUALITY BASED ON LOCATION AND ORIENTATION OF ADDITIVELY MANUFACTURED BUILD PARTS

(71) Applicant: THE BOEING COMPANY, Chicago, IL (US)

(72) Inventors: Eric M. Chapman, Bonney Law, WA (US); Dana A. Henshaw, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/854,017

(22) Filed: Apr. 21, 2020

(51) Int. Cl.
  *G05B 19/418* (2006.01)
  *G01B 21/20* (2006.01)
  *B29C 64/386* (2017.01)
  *B33Y 50/00* (2015.01)

(52) U.S. Cl.
  CPC ...... *G05B 19/41875* (2013.01); *B29C 64/386* (2017.08); *B33Y 50/00* (2014.12); *G01B 21/20* (2013.01); *G05B 19/41885* (2013.01)

(58) Field of Classification Search
  CPC ....... B29C 64/386; B33Y 50/00; G01B 21/20; G05B 19/41875; G05B 19/41885
  See application file for complete search history.

(56) References Cited

U.S. PATENT DOCUMENTS

| | | | |
|---|---|---|---|
| 2015/0165683 A1* | 6/2015 | Cheverton | B22F 3/1055 382/141 |
| 2016/0250810 A1* | 9/2016 | Lynch August | G05B 19/4099 700/98 |
| 2018/0001565 A1* | 1/2018 | Hocker | G01N 23/223 |
| 2018/0304360 A1* | 10/2018 | Fontana | B22F 3/1055 |
| 2019/0213338 A1* | 7/2019 | Zonouz | C07K 14/605 |
| 2019/0283333 A1* | 9/2019 | Hwang | G06F 11/0736 |
| 2020/0242496 A1* | 7/2020 | Salasoo | B29C 64/393 |
| 2020/0368947 A1* | 11/2020 | Companje | C08L 23/14 |

OTHER PUBLICATIONS

Kleszczynski et al. "Position Dependency of Surface Roughness in Parts from Laser Beam Melting Systems" 26th International Solid Free Form Fabrication (SFF) Symposium; 2015 (11 pages).

* cited by examiner

*Primary Examiner* — Ronald D Hartman, Jr.
(74) *Attorney, Agent, or Firm* — Philip S. Hof; The Small Patent Law Group

(57) ABSTRACT

An additive manufacturing system includes one or more processors configured to determine one or more geometrical characteristics of each of multiple segments of a build part at a candidate position of the build part relative to a platform. The one or more processors are configured to generate a quality score for each of the segments at the candidate position based on the one or more geometrical characteristics, The one or more processors are also configured to generate a simulation model of the build part at the candidate position for display. The simulation model includes graphic indicators corresponding to each of the segments. The graphic indicators are representative of the quality scores of the corresponding segments.

20 Claims, 6 Drawing Sheets

SYSTEM AND METHOD OF SIMULATING AND OPTIMIZING SURFACE QUALITY BASED ON LOCATION AND ORIENTATION OF ADDITIVELY MANUFACTURED BUILD PARTS

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of base material are deposited under computerized control. The deposited layers are selectively fused via the application of a focused energy source, such as a laser, which heats and bonds the material. The size and shape of the build part can be based on a three-dimensional computer model or another electronic data source. Additive manufacturing can be used to fabricate objects that have complex structures and shapes. Additive manufacturing techniques for fabricating metal build parts can allow greater design freedom and yield more precise and repeatable finished products than conventional metal manufacturing techniques, such as die-casting, extruding, and the like.

The set-up for an additive manufacturing build process includes selecting the design of the build part that is to be constructed and specifying the positioning of the build part on a build platform of the additive manufacturing instrument. The positioning can refer to the location of the build part relative to the build platform, such as relative to a center and/or to edges of the platform, as well as to an orientation of the planned build part relative to the platform, such as a rotational orientation about a vertical axis and/or an angular orientation (e.g., tilt or lean) of the build part. Typically, few factors, if any, are considered when determining the positioning of the build part relative to the platform. One known consideration involves arranging multiple build parts on the platform to increase a total number of build parts that can be printed during a common build process.

Generally, the build part positioning is determined without consideration of how the positioning will affect the surface and sub-surface quality of the resulting manufactured build part, such as the surface roughness, porosity, and other surface quality properties. After the additive manufacturing process, the build part is typically inspected and rough surfaces of the build part are ground down to increase smoothness. Post-processing tasks such as grinding rough surfaces of the build parts can be costly, difficult, time intensive, and/or labor intensive. Grinding of rough surfaces and additional post-processing tasks to improve the surface quality of the build parts reduces manufacturing efficiency and increases production costs. Additionally, for parts having inaccessible regions where typical post-processing may be ineffective or impossible, current methods may be insufficient. Furthermore, if the surface quality, sub-surface quality, or dimensional accuracy of a build part is sufficiently degraded during the additive manufacturing process, the entire built part may need to be scrapped, which is a waste of time and resources.

SUMMARY OF THE DISCLOSURE

In one or more embodiments, an additive manufacturing system is provided that includes one or more processors configured to determine one or more geometrical characteristics of each of multiple segments of a build part at a candidate position of the build part relative to a platform. The one or more processors are configured to generate a quality score for each of the segments at the candidate position based on the one or more geometrical characteristics. The one or more processors are also configured to generate a simulation model of the build part at the candidate position for display. The simulation model includes graphic indicators corresponding to each of the segments. The graphic indicators are representative of the quality scores of the corresponding segments.

In one or more embodiments, a method (e.g., of simulating surface quality of an additively manufactured build part) is provided. The method includes determining one or more geometrical characteristics of each of multiple segments of a build part at a candidate position of the build part relative to a platform. The method also includes determining a quality score for each of the segments at the candidate position based on the one or more geometrical characteristics and generating a simulation model of the build part at the candidate position for display. The simulation image includes graphic indicators corresponding to each of the segments. The graphic indicators are representative of the quality scores of the corresponding segments.

In one or more embodiments, an additive manufacturing system is provided that includes one or more processors configured to determine one or more geometrical characteristics of each of multiple segments of a build part at a candidate position of the build part relative to a platform. The one or more geometrical characteristics include an angle of incidence between a beam line extending from an electromagnetic energy source of an additive manufacturing instrument and a surface normal of a respective skin of the corresponding segment proximate to the beam line. The one or more processors are also configured to determine a quality score for each of the segments at the candidate position based on the one or more geometrical characteristics such that segments of the build part with lower angles of incidence have higher quality scores than segments of the build part with greater angles of incidence. The one or more processors are configured to compare the quality scores of the segments at the candidate position to determined quality scores of the segments of the build part at other candidate positions to provide one or more preferred positions of the build part for achieving improved quality of the build part by additively manufacturing the build part at one of the one or more preferred positions relative to additively manufacturing the build part at the candidate position.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
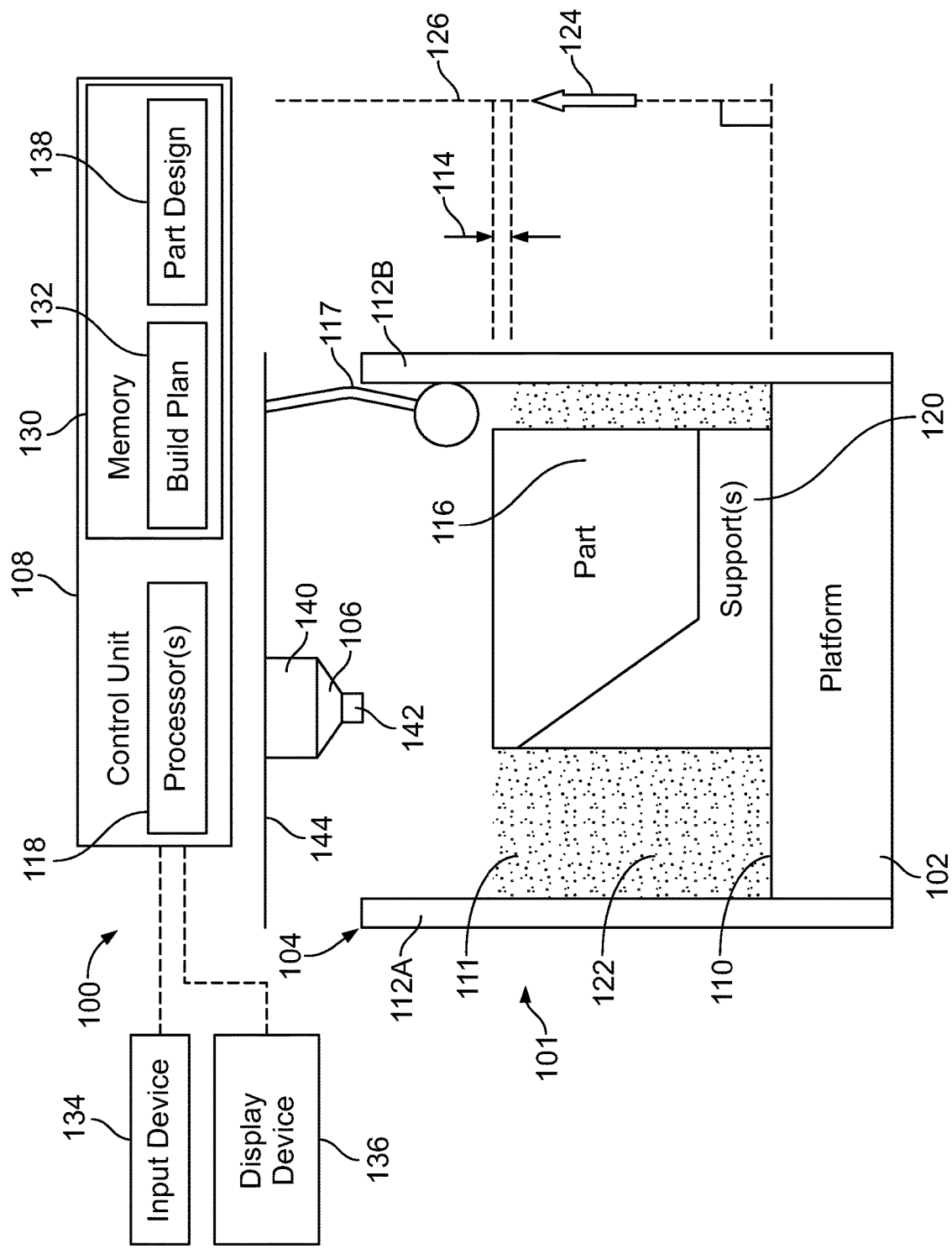
FIG. 1 is a schematic illustration of an additive manufacturing system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In consideration of the cost, time, and labor of performing surface treatments after the additive build process, there are several advantages in techniques for additively manufacturing build parts that have inherently improved surface quality, near-surface quality, and geometric accuracy, thereby eliminating or at least expediting post-build surface treatments. Embodiments of the present disclosure provide a system (e.g., an additive manufacturing system) and method of simulating surface quality of additively manufactured build parts. For example, based on input parameters regarding a part design and proposed position within the additive manufacturing instrument, the system and method may generate a virtual simulation data model. The virtual simulation model (also referred to herein as simulation model) is a representation of the build part and indicates a projected surface quality of each of different segments of the build part if the build part is additively manufactured at the proposed position. The simulation model is a projection that is generated prior to the build part being additively manufactured. The simulation model may be generated according to mathematical functions and/or historical experimental observations. The simulation model can be displayed as one or more images on a display device for observation by an operator. The simulation of surface quality allows for adjustments prior to building the part, based on the information presented. For example, an operator or automated system may modify a proposed position of the build part on a build platform of the additive manufacturing instrument in an effort to increase the surface quality of one or more specific surfaces of the build part and/or to increase an overall surface quality of the build part. The system disclosed herein enables the construction of build parts with high standards of surface quality and dimensional accuracy. For example, the system may generate build products that satisfy quality requirements without any post-processing to improve surface quality or with only limited post-processing.

The build part described herein refers to a virtual object that is designed to be additively manufactured as well as a physical object produced via an additive manufacturing build process. The position or positioning of a build part within the additive manufacturing instrument refers to the location and orientation of the build part. For example, the location represents the specific area of the build platform of the additive manufacturing instrument on which the build part is constructed layer by layer. Often, multiple build parts are constructed during a common build process, so the build parts are arranged at different locations along the upper surface of the build platform. The orientation of the build part generally refers to a direction that the build part (that is to be constructed) will face and a tilt or lean of the build part. For example, the build part may be oriented about a longitudinal axis. The orientation may include a rotation of the build part about the longitudinal axis. The orientation may also include a tilt or lean of the longitudinal axis relative to a vertical axis.

The surface quality of a given surface can refer to a surface roughness, a porosity content of the wall defining the given surface, structural and/or compositional uniformity of the wall, and/or the like. Generally, higher quality surfaces of additively manufactured build parts have fewer pores, smaller pores, and are smoother (e.g., less rough) than lower quality surfaces. One or more of the embodiments described herein are configured to produce build parts that have desirable and/or satisfactory surface and sub-surface quality and dimensional accuracy to reduce the scrap rate and reduce the amount of surface finishing during post-processing after the build process.

In one or more embodiments disclosed herein, the system analyzes a candidate position of a designated build part on the platform. The candidate position may be input via an operator or selected by the system. The system may determine one or more geometrical characteristics of each of multiple different segments or sections of the build part based on the geometry of the part and the candidate position. The system may use the respective one or more geometrical characteristics of each segment to generate a quality score for that surface. For example, the system utilizes the geometrical characteristics determined for a first segment of the build part to calculate a quality score for the first segment, and the system utilizes the geometrical characteristics determined for a second segment of the build part to calculate a quality score for the second segment. The quality score represents a predicted accuracy, surface quality, and/or sub-surface quality of the corresponding segment. The surface quality can include a predicted roughness, porosity, and/or the like, of a surface of the segment. The quality score is a projection or estimation of the quality of a segment of a physical build part if the additive manufacturing instrument is controlled to construct the build part according to the input part design, positioning of the part relative to the platform, and build parameters (e.g., power, speed, beam diameter, beam pass separation, and the like). The system may generate different quality scores for different segments of the build part due at least in part to different orientations and locations of the segments relative to an electromagnetic energy source that emits focused energy beams, for reasons described herein. The one or more embodiments described herein can simulate the quality of the build part to enable adjusting one or more parameters prior to manufacturing the build part in an effort to improve accuracy, surface quality, and/or sub-surface quality of the build part that is subsequently constructed, relative to building the part at a random or initially-proposed position.

The system generates the simulation model based on the part design and the quality scores for the different segments. For example, the simulation model may include or represent one or more virtual images of the build part according to the part design. The virtual images may be two dimensional or three dimensional. The simulation model may also be able to simulate the build part at different times during the build process to show the construction of different layers. Optionally, the displayed virtual image can include graphic indicators superimposed on the segments of the build part. For example, the virtual image may superimpose a first graphic indicator on the first segment of the build part and a second graphic indicator on the second segment. The graphic indicators may be colors, numbers, letters, symbols, or the like that correspond to the quality scores. The system selects the first graphic indicator because the first graphic indicator represents the first quality score and selects the second graphic indicator because the second graphic indicator represents the second quality score. In a non-limiting example, if the first and second quality scores indicate that the first segment is projected to have a higher surface quality than the second segment, then the first graphic indicator may be a color associated with good or high quality, such as green, and the second graphic indicator may be a color associated with worse or lower quality, such as orange. By displaying the virtual image on a display screen, the system described herein can provide a person, such as an operator of the additive manufacturing instrument, with a visual indication of predicted surface quality along different segments of the build part before depositing any layers of powder within the additive manufacturing instrument to actually construct the build part.

Optionally, the operator may utilize an input device of the system to input a second candidate position of the build part that has a different location on the platform and/or a different orientation than the candidate position previously analyzed. The system is configured to repeat the analysis based on the second candidate position to generate a second virtual image of the build part. The second virtual image includes graphic indicators representing quality scores determined based on geometrical characteristics of the segment of the build part at the second candidate position. This process can be repeated any number of times to generate a plurality of virtual images depicting the projected quality characteristics of the build part manufactured at different locations and/or orientations relative to the additive manufacturing instrument. The predictive surface quality information presented to the operator can be used in determining a more preferred (e.g., an optimized) part position within the build envelope of the additive manufacturing instrument than if the build part is randomly positioned or positioned based only on spacing considerations. Once the operator selects a desired position, the system may control the additive manufacturing instrument to construct the build part, layer by layer, at the selected position (e.g., location and orientation).

In an embodiment, the system may automatically evaluate many potential candidate positions of the build part (without operator input) to determine a group of one or more preferred positions that are predicted to have greater quality than the other candidate positions that are evaluated. Then, the system can present the one or more preferred positions to an operator to enable the operator to choose which of the preferred positions to select for building the build part.

FIG. 1 is a schematic illustration of an additive manufacturing system 100 according to an embodiment. The additive manufacturing (AM) system 100 includes an additive manufacturing (AM) instrument 101, a control unit 108, an input device 134, and a display device 136. The AM instrument 101 includes a build platform (or plate) 102, an enclosure 104, an electromagnetic energy source 106, and a source material applicator 117. The platform 102 is a planar surface of the AM instrument 101 and may be represented by a plate, a lower wall of the enclosure 104, or the like. The AM instrument 101 performs additive manufacturing build processes to form three-dimensional build parts 116. Each build part 116 is built up from an upper surface 110 of the platform 102 by selectively depositing a source material 111 in consecutive layers 114 and fusing the source material 111 at designated locations according to a build plan 132. Each layer 114 is relatively thin, such as no greater than 1 mm, no greater than 0.5 mm, no greater than 0.25 mm, or the like.

The AM system 100 in FIG. 1 can be utilized to perform powder bed fusion additive manufacturing techniques. Suitable additive manufacturing processes can include, for example, vat photopolymerization (e.g., stereolithography, digital light processing, continuous digital light processing, light emission diode, and/or the like), powder bed fusion (e.g., binder jetting, selective laser melting, and the like), material jetting (e.g., material jetting, nanoparticle jetting, drop on demand, and the like), and multi jet fusion. At least most of these processes involve depositing a layer of material on a build surface and fusing selective portions of the material using a form of energy and/or polymer binding agent that scans the surface based on a CAD pattern. Other processes involve powder-feed or wire-feed directed energy deposition (DED), in which material is only deposited on the build part without depositing a wide layer on the build surface and selectively fusing material from the layer.

The source material 111 may be in powder form. In a non-limiting example, the powder includes one or more metals in the form of metal particles, flakes, or the like. The powder optionally can also include non-metallic filler materials intermixed with the metal material. The metal material may include various metal types, such as aluminum, stainless steel, copper, nickel, cobalt, titanium, or the like, and alloys of the various metal types. Possible non-metallic filler materials within the powder can include ceramics, polymers (e.g., plastics), silica, or the like. The powder that is deposited but is not fused to form part of the build part 116 defines a powder bed 122 of unused material 111 that is contained within walls 112 of the enclosure 104. In an embodiment, the part 116 is encased within the powder bed 122 during the build process. In an alternative embodiment, the source material 111 is free of metals.

The build part 116 is gradually formed or constructed by aggregating layers 114 in a build direction 124 along a build axis 126. With each successive addition of material 111 to the top of the part 116, the part 116 grows in the build direction 124. The build direction 124 extends away from the platform 102. In the illustrated embodiment, build axis 126 is orthogonal to a plane of the upper surface 110 of the platform 102.

The AM system 100 generates new layers of the part 116 by spreading a thin layer or stratum of the powder material 111 over the top of the part 116. For example, the source material applicator 117 of the AM system 100 deposits each layer 114 of material 111. The source material applicator 117 includes or represents a spreader or re-coater device that evenly spreads a thin layer of the material 111, an injector that injects the material 111, or the like. The material 111 can be stored in a reservoir prior to use. The source material application 117 is controlled by the control unit 108.

Then, the electromagnetic energy source 106 is controlled by the control unit 108 to emit focused electromagnetic energy towards the source material 111 in the top surface layer 114 to fuse designated portions of the material 111 to the build part 116, defining a new layer or fraction of the part 116. The focused electromagnetic energy can be in the form of a beam that impinges upon the stratum of the powder, causing a selected portion of the stratum to melt and adhere to the part 116 to form a new top portion thereof. For example the energy source 106 can be a laser device that generates high energy laser beams. In an embodiment, the electromagnetic energy source 106 is suspended above the top of the powder bed 122. For example, the electromagnetic energy source 106 may be disposed about 0.5 meters (m) above the upper surface 110 of the platform 102. The focused electromagnetic energy emitted from the energy source 106 may be aimed at or directed to different locations of the power bed 122 to fuse different selected portions of the top layer 114 to the part 116. The electromagnetic energy source 106 may include a scanning head that enables directing the beams to different locations within a designated coverage area without moving (e.g., displacing) the location of the electromagnetic energy source 106 relative to other components of the AM instrument 101. The orientation of the scanning head and parameters of the energy beams (e.g., timing, energy intensity, beam width, etc.) may be controlled by the control unit 108 via control signals. The process consecutively repeats according to instructions within the build plan 132 until the build part 116 is fully formed.

The AM instrument 101 may be controlled, according to the build plan 132, to form one or more external supports 120 during the build process for structurally supporting overhanging features of the build part 116. The one or more external supports 120 are additively formed during the same build process that forms the build part 116. For example, the build part 116 and the external supports 120 are both composed of a series of stacked material layers that are fused together during an additive manufacturing build process. Optionally, the internal structure (e.g., density, lattice, etc.) and/or material composition of the external supports 120 may be different than the build part 116. For example, the structure of the external support 120 may be less dense than the structure of the build part 116.

The control unit 108 represents hardware circuitry that includes and/or is connected with one or more processors 118 (e.g., one or more microprocessors, integrated circuits, microcontrollers, field programmable gate arrays, etc.) that perform operations described in connection with the control unit 108. The one or more processors 118 may operate based on programmed instructions. The one or more processors 118 may include a single processor or multiple processors that operate to perform the functions described herein. The one or more processors 118 are referred to herein in the plural form "processors" without limiting the scope to requiring multiple processors 118. The control unit 108 also includes a tangible and non-transitory computer-readable storage medium (e.g., memory) 130. The memory 130 may store the programmed instructions (i.e., software) that dictate the operations of the processors 118. For example, the memory 130 stores the build plan 132 associated with the build part 116 that is being fabricated.

The memory 130 may also store a part design file 138 of the build part 116. The part design file 138 may be a computer-aided design (CAD) file or another data file that describes the physical characteristics of the part 116, such as the shape, size, and/or composition of the part 116. The build plan 132 may be generated based on the part design 138 file. For example, the build plan 132 may be a data file that dictates parameters, conditions, settings, and/or operations of the AM instrument 101 in order to produce a physical build part 116 which is a replica or match of the virtual part defined by the design file 138. One or more parameters or settings dictated by the build plan 132 may include a positioning of the build part 116 on the platform 102, a sequence of actions taken by the AM instrument 101 to build the part 116 (e.g., a path for the focused energy beam), the locations of supports 120, and the like. Additional parameters specified in the build plan 132 may include settings of the focused electromagnetic energy (e.g., power, beam width, etc.), offsets, layer thicknesses, gas flow parameters, and the like. The control unit 108 (e.g., the processors 118 thereof) controls the operations of the electromagnetic energy source 106, the source material applicator 117, and/or other components based on the build plan 132 to produce the build part 116.

The processors 118 of the control unit 108 are communicatively connected to the input device 134 and the display device 136. The input device 134 may include a touchpad, a touchscreen, a keyboard, a mouse, physical buttons, a joystick, or the like. The input device 134 enables an operator to provide commands to the AM system 100. In a non-limiting example, the operator can use the input device 134 to select a candidate position of the build part 116 on the platform 102 and/or to modify the candidate position. The display device 136 includes a display screen that is configured to display the simulation image generated by the control unit 108. Optionally, the input and display devices 134, 136 may be integrated together within a unitary device, such as a laptop computer, a desktop computer, a workstation, a tablet computer, a mobile, handheld computing device (e.g., smartphone), or the like. The processors 118 may be operably connected to the input device 134 and/or the display device 136 via a wired or wireless communication pathway.

In one embodiment, the processors 118 of the control unit 108 are configured to generate the build plan 132. For example, the processors 118 may access the part design file 138 that is stored in the memory 130. The processors 118 may receive user inputs selecting a desired position of the build part 116 on the platform 102. The one or more embodiments described herein may assist in the selection of the desired position of the build part 116. The processors 118 may generate the build plan 132 based on the design of the part 116 and the desired position of the part 116. For example, the build plan 132 is generated to outline a sequence of actions of the AM instrument 101 to build the part 116 to have the designated design and at the desired location and orientation relative to the platform 102. The design file 138 of the design can be received from a remote computing device or generated locally via operator inputs on the input device 134. In an alternative embodiment, the processors 118 do not generate the build plan 132, but rather implement control instructions that are generated remote from the AM instrument 101. For example, machine instruction may be processed externally by a computer or processing unit and transferred to the AM instrument 101 to be performed by the AM instrument 101.

Figure 2:
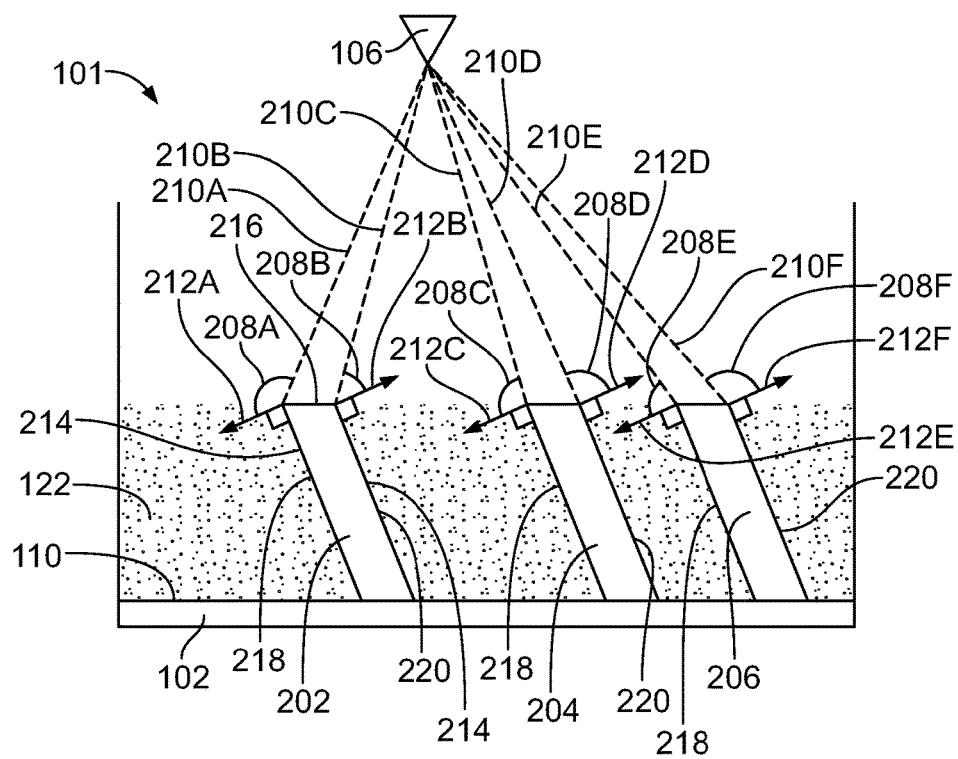
FIG. 2 illustrates a schematic diagram of an additive manufacturing instrument within the additive manufacturing system according to an embodiment.

FIG. 2 illustrates a schematic diagram of the AM instrument 101 according to an embodiment. FIG. 2 shows a first coupon 202, a second coupon 204, and a third coupon 206 being additively manufactured on the upper surface 110 of the platform 102. The coupons 202, 204, 206 are discrete and spaced apart from one another, but may be representative of different segments of a single build part, such as the part 116 shown in FIG. 1, that will subsequently conjoin during the build process. The term coupon is used herein in a general, non-limiting sense to represent additively manufactured build parts and/or structures either unfinished during the build process or completed. In the illustrated embodiment, the coupons 202, 204, 206 have the same size, shape, and orientation relative to the platform 102. Furthermore, the coupons 202, 204, 206 are formed using the same materials and the same parameters of the energy source 106. The coupons 202, 204, 206 are encased within the powder bed 122. The only differences between the coupons 202, 204, 206 are in the positioning of the coupons 202, 204, 206 relative to the AM instrument 101 (e.g., the energy source 106 and the platform 102).

The positioning of the coupons 202, 204, 206 can refer to the location and orientation of the coupons 202, 204, 206 relative to the energy source 106. More specifically, the positioning can refer to the location and orientation of each of multiple different segments or layers of the coupons 202, 204, 206 relative to the energy source 106. The positioning can be characterized by the angle of incidence of individual segments of the coupons 202, 204, 206 relative to the energy source 106, also referred to as the angle of incidence to the part surface normal at the point of lasing.

The angle of incidence 208 is the angle between a beam line 210 and a line 212 normal to (e.g., surface normal vector of) the skin 214 or side surface of the respective segment proximate to the beam line 210 point of intersection with the segment. The surface normal is a vector extending orthogonally from a plane that is tangent to the surface of the segment at the impact point of the energy beam. The surface normal extends outward from that impact point. If the surface at the impact point is horizontal, the plane tangent to the surface is vertical and the surface normal extends from the impact point parallel to the horizontal. The beam line 210 represents the path of a laser beam or other focused energy beam that is emitted or would be emitted from the energy source 106 to a top or surface layer 216 of the respective coupon segment to generate the surface layer 216. The surface layer 216 is the most-recently formed layer at a given time that is at the top (e.g., end) of the layer stack. The skin 214 represents the side surface or edge of one or more layers of the respective coupon immediately below the surface layer 216 and proximate to the beam line 210. The line or vector 212 is perpendicular to the skin 214. If the skin 214 is curved (e.g., non-planar), the line 212 can be normal to the curved skin 214 at a location just below the surface layer 216. The build parts are three-dimensional, so the lines 212 of different skin segments of the same or different parts can have different vertical, lateral, and/or longitudinal or depth components relative to the energy source 106. The angle of incidence 208 as described herein is based on the positioning (e.g., location and orientation) of a given segment of a build part relative to the energy source 106. For example, the surface normal 212 is affected by the orientation of the skin 214, and the beam line 210 is affected by the location of the segment (e.g., the skin 214) relative to the energy source 106.

The three coupons 202, 204, 206 in FIG. 2 have the same sizes and shapes and the same orientations relative to the platform 102. The first, second, and third coupons 202, 204, 206 are overhanging objects in the illustrated embodiment. The coupons 202, 204, 206 each include a respective downskin 218 that faces generally towards the platform 102 and an upskin 220 that is opposite the downskin 218. The upskins 220 generally face upward away from the platform 102. The downskin 218 and upskin 220 of each coupon 202, 204, 206 represent angled skins 214, so the normal lines 212 are perpendicular to the areas or portions of the downskin 218 and upskin 220 proximate to the surface layer 216.

The three coupons 202, 204, 206 have different positions relative to the energy source 106, which are indicated by different angles of incidence 208. For example, the first coupon 202 defines a first angle of incidence 208A between the line 212A normal to the respective downskin 218 and a first beam line 210A. The first coupon 202 defines a second angle of incidence 208B between the line 212B normal to the respective upskin 220 and a second beam line 210B. The second coupon 204 defines a third angle of incidence 208C between the line 212C normal to the respective downskin 218 and a third beam line 210C. The second coupon 204 defines a fourth angle of incidence 208D between the line 212D normal to the respective upskin 220 and a fourth beam line 210D. The third coupon 206 defines a fifth angle of incidence 208E between the line 212E normal to the respective downskin 218 and a fifth beam line 210E. The third coupon 206 defines a sixth angle of incidence 208F between the line 212F normal to the respective upskin 220 and a sixth beam line 210F. In the illustrated embodiment, the first, third, and sixth angles of incidence 208A, 208C, 208F are obtuse (e.g., greater than 90 degrees). The skins 214 associated with obtuse angles of incidence are referred to herein as outskins for reasons provided below. The second and fifth angles of incidence 208B, 208E are acute (e.g., less than 90 degrees). The skins 214 associated with acute angles of incidence are referred to herein as inskins. The fourth angle of incidence 208D is a right angle (e.g., 90 degrees). Skins 214 associated with right angles of incidence represent an inflection or tipping point between outskins and inskins.

The orientations of the skins 214 of the coupons 202, 204, 206 relative to the platform 102 represents another geometrical characteristic that optionally can be used to simulate and predict part quality prior to the build process. The orientation of each skin 214 relative to the platform 102 can refer to a tilt angle defined between the surface normal of the skin 214 and the upper surface 110 of the platform 102 on which the coupons 202, 204, 206 are constructed. In general, the surface normal of downskins 218 face downward towards the platform, and the surface normal of upskins 220 face upward away from the platform. The downskins 218 of the first, second, and third coupons 202, 204, 206 all have the same orientations relative to the platform 102 in FIG. 2, and the upskins 220 of the coupons 202, 204, 206 also have the same orientations relative to the platform 102.

Experimental testing has demonstrated that the angle of incidence 208 between the beam line 210 and the line 212 normal to the skin 214 can significantly impact the formation of the build part, such as the surface quality, near-surface quality, porosity, and dimensional accuracy. For example, in an experimental setup similar to that shown in FIG. 2, it was determined that outskins, in which the angle of incidence 208 is greater than a designated threshold angle, have significantly worse properties (e.g., surface and near-surface quality, porosity, and dimensional accuracy) than inskins, in which the angle of incidence 208 is less than the designated threshold angle, even though all test parameters were the same. The designated threshold angle may be an angle defined from 70 degrees to 110 degrees, such as 70 degrees, 80 degrees, 90 degrees, 100 degrees, or the like. More specifically, the threshold angle can be an angle between 80 degrees and 100 degrees. In a non-limiting embodiment, the designated threshold angle is 90 degrees. When the designated threshold angle is 90 degrees, obtuse angles of incidence are classified as outskin, and acute angles of incidence are classified as inskin. The outskins shown in FIG. 2 include the downskin 218 of the first coupon 202, the downskin 218 of the second coupon 204, and the upskin 220 of the third coupon 206. The inskins shown in FIG. 2 include the upskin 220 of the first coupon 202 and the downskin 218 of the third coupon 206. These results indicate that some downskin surfaces 218 can be inskins (e.g., the downskin 218 of the third coupon 206) and other downskin surfaces 218 can be outskins (e.g., the downskins 218 of the first and second coupons 202, 204), which have degraded properties relative to the inskins. Similarly, some upskin surfaces 220 can be inskins (e.g., the upskin 220 of the first coupon 202) and other upskin surfaces 220 can be outskins (e.g., the upskin 220 of the third coupon 206).

A potential explanation for this phenomenon is different local absorption of the focused beam energy due to different incident angles of the laser beam relative to the proximal part geometry, as suggested in S. Kleszczynski, A. Ladewig, K. Friedberger, J. zur Jacobsmühlen, D. Merhof, and G. Witt (2015). Position Dependency of Surface Roughness in Parts from Laser Beam Melting Systems. 26th International Solid Free Form Fabrication (SFF) Symposium, USA, pp 360-370, which is incorporated by reference herein in its entirety. For example, when forming a surface layer 216 along or proximate to an outskin surface (e.g., which defines an angle of incidence 208 greater than 90 degrees), some of the energy of the focused beam may be absorbed into the underlying powder within the powder bed 122, which affects the melt pool.

Figure 3:
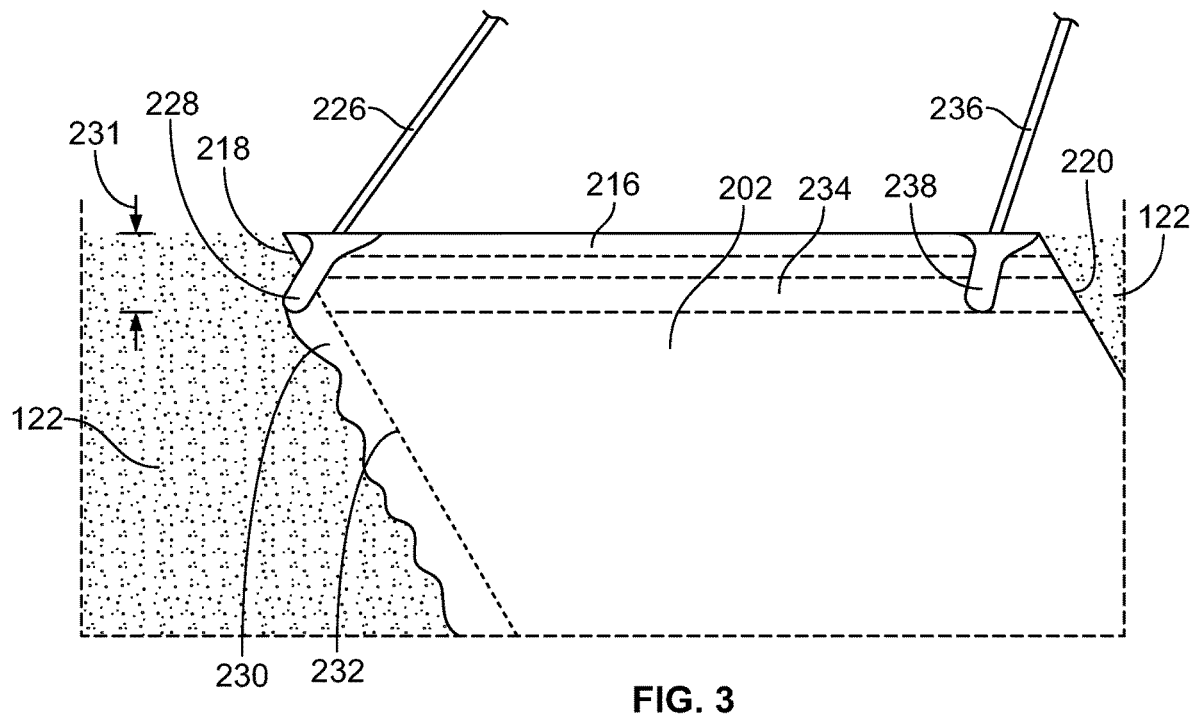
FIG. 3 illustrates a close-up portion of a first coupon shown in FIG. 2.

FIG. 3 illustrates a close-up portion of the first coupon 202 shown in FIG. 2. A laser beam 226 impinges upon the surface layer 216 proximate to the downskin 218 of the coupon 202. Because the angle of incidence 208A between the laser beam 226 and the line 212A normal to the downskin 218 is greater than 90 degrees, as shown in FIG. 2, the downskin 218 is classified as an outskin. The high energy laser beam 226 melts the source material, causing a melt pool 228. The shape of the melt pool 228 may not accurately accommodate for the part dimension, at least along areas proximate to the outskin. For example, the melt pool 228 in FIG. 3 penetrates a depth 231 that extends beyond the desired downskin edge 232 of the coupon 202, such that the energy of the beam 226 blows out into the powder bed 122. The energy absorbed by the powder can cause additional, undesired material, referred to herein as melt extensions 230, to form along the downskin surface 218 as the material cools and solidifies. The melt extensions 230 can increase surface roughness (e.g., reduce surface quality), increase porosity, and dimensional inaccuracy. The dimensional inaccuracy refers to the increased thickness or lateral width of the downskin 218 relative to the thickness/lateral width defined by the desired downskin edge 232. It is noted that the top-most layer or layers, including the surface layer 216, may be dimensionally accurate, at least at the current time during the build process. The laser penetration causes the previously-formed layers below the top-most layer(s) to be grown. In FIG. 3, for example, the melt pool 228 causes melt extensions 230 to grow along the layer 234 that is two layers below the surface layer 216. The melt extensions 230 aggregate during the additive build process as additional layers of material are formed.

With continued reference to FIG. 2, the angle of incidence 208B at the upskin 220 of the first coupon 202 is quite different from the angle of incidence 208A at the downskin 218 of the first coupon 202. The angle of incidence 208B is acute, indicating that the upskin 220 of the first coupon 202 represents an inskin. Inskins may be associated with improved quality characteristics, such as surface quality, near-surface quality, porosity, and dimensional accuracy, relative to outskins. The variation in quality may be attributable to the geometry of the build part underlying the newly-deposited surface layer 216. For example, energy from a laser beam 236 that is directed along the beam line 210B shown in FIG. 2 may be absorbed by the partially solidified or consolidated underlying material of the first coupon 202, resulting in less energy directed beyond the upskin 220 boundary and into the powder bed 122 (compared to the downskin 218). The melt pool 238 formed by the laser beam 236 may not penetrate through the upskin 220 boundary due to the angle of the beam 236 relative to the geometry of the coupon 202. For example, the melt pool 238 extends at least partially inward towards a lateral center of the coupon 202. Essentially, there is more of the partially solidified underlying material of the coupon 202 present to absorb the energy of the beam 236 than is present to absorb the energy of the beam 226. As a result, there is less heating of the powder bed 122 along the upskin 220 than the amount of heating of the powder bed 122 along the downskin 218, so fewer melt extensions and other non-uniformities form along the upskin surface 220, improving the surface quality and near-surface quality, the dimensional accuracy, and the porosity relative to the downskin 218.

As shown in FIG. 2, the angle of incidence 208D at the upskin 220 of the second coupon 204 is a right angle, which indicates that the beam line 210D is collinear with the angle of the upskin 220 just below the layer of material being deposited or most recently deposited. The upskin 220 of the second coupon 204 may be within tipping zone or inflection zone between the inskins and the outskins. For example, the inflection zone can represent a range of angles that is between the inskins and outskins. The system disclosed herein may treat inflection zone skins differently than the inskins and outskins. The inflection zone can be a range centered at an inflection point, such as, but not limited to, 90 degrees. For example, the inflection zone can be between 70 degrees and 110 degrees, 80 degrees and 100 degrees, or the like.

Figure 4:
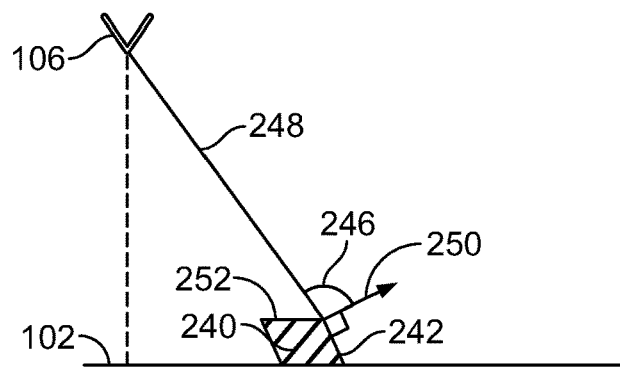
FIG. 4 illustrates a schematic diagram of the additive manufacturing instrument during a first stage in the construction of a single coupon according to an embodiment of the present disclosure.
Figure 5:
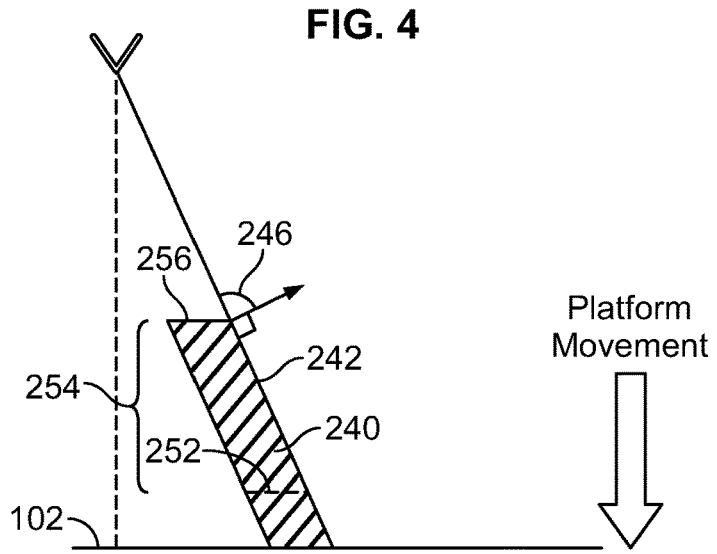
FIG. 5 illustrates a schematic diagram of the additive manufacturing instrument during a second stage in the construction of the coupon shown in FIG. 4.
Figure 6:
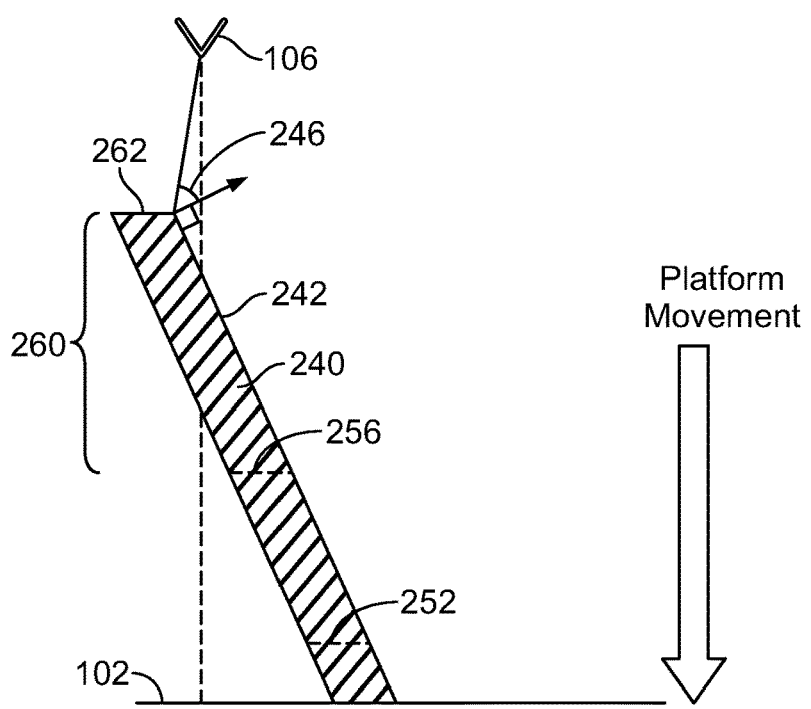
FIG. 6 illustrates a schematic diagram of the additive manufacturing instrument during a third stage in the construction of the coupon shown in FIGS. 4 and 5.

During the additive manufacturing process in which layers of material are consecutively deposited in a stack according to a designated build part geometry, the angle of incidence of a given skin of the build part relative to the beam emitter can change over time. For example, FIGS. 4-6 illustrate three different stages in the construction of a single coupon 240 over time by the AM instrument 101 according to an embodiment. The stages are chronological, such that the stage shown in FIG. 4 is prior to the stages shown in FIGS. 5 and 6, and the stage shown in FIG. 5 is before the stage shown in FIG. 6. FIGS. 4-6 show the effects of a part being built with a platform 102 that gradually drops (e.g., moves away from the energy source 106) as additional layers of material are deposited. The energy source 106 is disposed in the same position at each of the three illustrated stages of the build process, such that the energy source 106 is not moved. The coupon 240 that represents the build part in FIGS. 4-6 has a rhomboid shape with parallel, linear upskin 242 and downskin 244 surfaces.

The angle of incidence 246 based on the part geometry at the upskin 242 relative to the energy source 106 changes over time. As described above, the relevant angle of incidence 246 is defined between a beam line 248 from the energy source 106 and the line 250 normal to the portion of the upskin 242 proximate to the current surface layer 252 of the coupon 240. In FIG. 4, the angle of incidence 246 is an obtuse angle (e.g., greater than 90 degrees), which indicates that the upskin 242 has an outskin classification. The segment of the coupon 240 formed at or proximate to the upskin 242 may have a degraded quality and/or accuracy that requires additional finishing steps post-build to increase the smoothness and/or provide proper dimensional alignment.

FIG. 5 shows that the platform 102 has moved and an additional portion 254 of the coupon 240 has been formed subsequent to the stage shown in FIG. 4. The additional portion 254 extends from the previous surface layer 252 to a current surface layer 256. In the illustrated stage, the angle of incidence 246 based on the upskin 242 is a right angle, which indicates that the upskin 242 is at the tipping or inflection point between the outskin and inskin classifications. The segment of the coupon 240 formed at or proximate to the upskin 242 at the surface layer 256 is expected to have better quality and/or accuracy than the upskin 242 at the previous surface layer 252 due to the difference in angle of incidence 246.

FIG. 6 shows that the platform 102 has moved farther away from the fixed energy source 106 than shown in FIG. 5, and an additional portion 260 of the coupon 240 has been formed subsequent to the stage shown in FIG. 5. The additional portion 260 extends from the previous surface layer 256 to a current surface layer 262. In the illustrated stage, the angle of incidence 246 based on the upskin 242 is an acute angle (e.g., less than 90 degrees), which indicates that the upskin 242 has an inskin classification. The segment of the coupon 240 formed at or proximate to the upskin 242 at the surface layer 262 is expected to have better quality and/or accuracy than the upskin 242 at the previous surface layers 256, 252 due to the angle of incidence 246 differences. FIGS. 4-6 show that, as the rhomboid coupon 240 grows taller and the positioning of the surface layer changes relative to the energy source 106, the upskin 242 can transition from representing an outskin to an inskin, and vice-versa. Therefore, multiple layers of the build part geometry and design are evaluated to determine the angle of incidence effects on the build part. Optionally, every layer of the build part geometry along skin surfaces is evaluated for classification as either an outskin, an inskin, or an inflection point.

Figure 7:
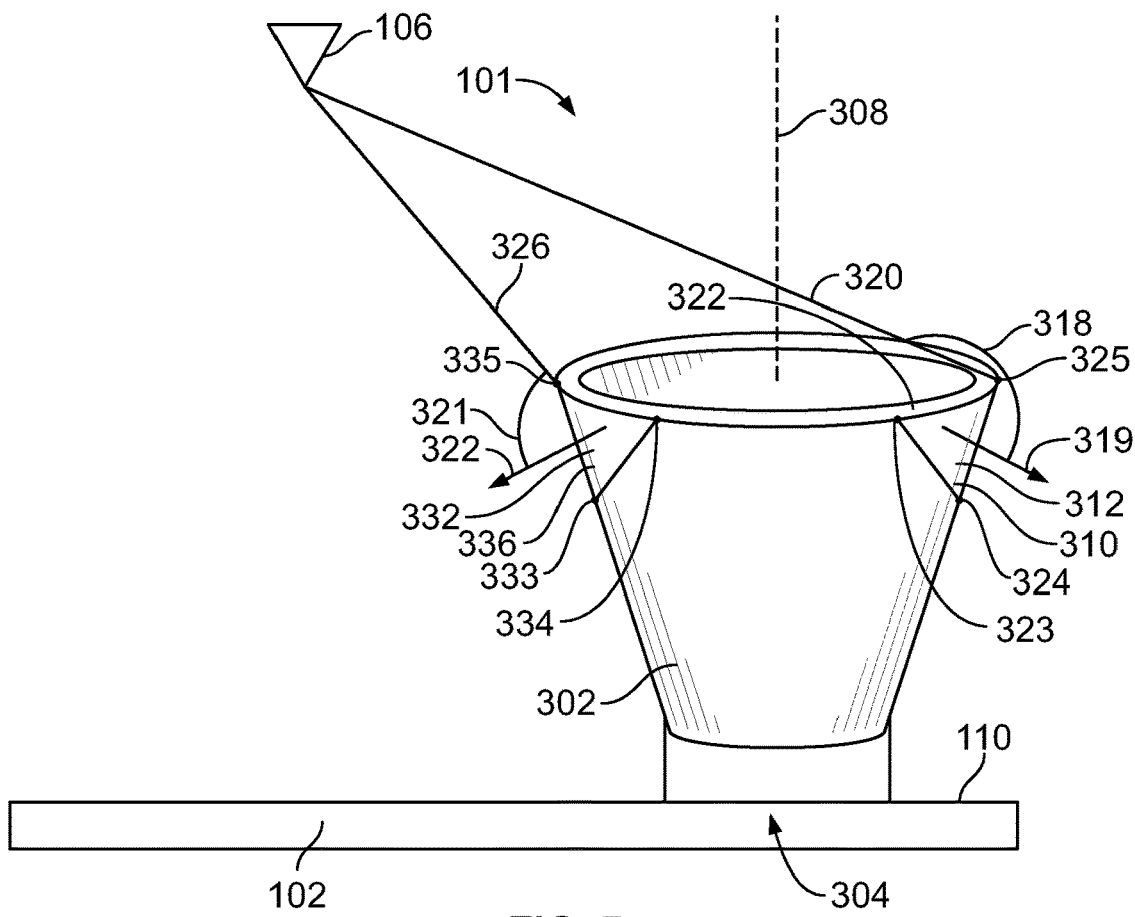
FIG. 7 illustrates the additive manufacturing instrument including a virtual build part according to an embodiment.

FIG. 7 illustrates the additive manufacturing instrument 101 including a virtual build part 302 according to an embodiment. The virtual build part 302 is located at a candidate position 304 on the build platform 102. The virtual build part 302 is representative of internal functionality of the processors 118 of the control system 108 of the AM system 100 to predict the surface quality of one or more segments of a build part prior to actually additively manufacturing the build part. Optionally, the virtual build part 302 shown in FIG. 7 is for descriptive purposes and is not actually displayed to an operator. Alternatively, the virtual build part 302 or a similar representation is displayed on the display device 136 (shown in FIG. 1) to indicate to an operator the status of operations of the processors 118 to predict the part quality.

The size and shape of the virtual build part 302 is based on the part design file 138 (shown in FIG. 1). The processors 118 may access the part design file 138, such as in the memory 130, to determine the design of the build part 302. In the illustrated example, the build part 302 has a hollow conical shape that is oriented about a central longitudinal axis 308. The design of the build part 302 may be based in a coordinate system, such as a spherical/polar coordinate system or a Cartesian coordinate system with three orthogonal axes. For example, every point of the build part 302 may have corresponding positional coordinates in the coordinate system.

The candidate position 304 of the build part 302 may be selected by an operator using the input device 134 or selected by the processors 118 as one of a multitude of candidate positions to be evaluated. The candidate position 304 refers to the location and orientation of the build part 302 relative to the AM instrument 101, such as to the platform 102 and the electromagnetic energy source 106. In FIG. 7, the candidate position 304 is offset from the electromagnetic energy source 106, such that the build part 302 is not centered beneath the energy source 106. The positions of the energy source 106 and the platform 102 may be known by the processors 118. The candidate position 304 may specify a particular, discrete location on the build platform 102 and a particular, discrete orientation of the build part 302 relative to the platform 102. For example, the candidate position 304 may dictate centering the build part 302 at location (x, y, z) on the platform 102, and orienting the build part 302 such that the longitudinal axis 308 is orthogonal to the upper surface 110 of the platform 102. The orientation may also specify a rotation angle of the build part 302 about the longitudinal axis 308 relative to the AM instrument 101. For example, if the build part that is modeled includes a protrusion, the rotation angle characterizes the orientation of the protrusion about the longitudinal axis 308. The AM instrument 101 may define an instrument coordinate system that represents the build volume. The instrument coordinate system can be spherical/polar and/or Cartesian. The candidate position of the build part can be defined in the instrument coordinate system. In an embodiment, the processors 118 may determine the candidate position 304 by mapping the positional coordinates of the build part 302 into the instrument coordinate system. For example, the processors 118 may utilize a transfer function to convert the positional coordinates of the build part 302 from the coordinate system of the build part to the instrument coordinate system.

Upon determining (e.g., receiving, accessing, selecting, or the like) the candidate position 304, the processors 118 are configured to determine and analyze geometrical characteristics of the virtual build part 302 in the candidate position 304 for simulating the quality of various segments of the build part before physically producing the build part. The build part 302 may be virtually partitioned (e.g., tessellated) into a plurality of segments. The segments may have any size and shape. Each segment may have a height as short as the thickness of one layer, such that build part may be examined layer by layer. Optionally, each segment height may represent multiple layers of material. In an embodiment, the segments have a thickness or depth dimension, such that the segments include more material than the surface that is visible. For example, each segment may have a designated depth, such as 0.5 cm, 1.0 cm, or the like. Alternatively, the segments may lack a thickness or depth dimension, and only represent the surface of the build part. In the illustrated embodiment, the segments are triangles that have heights representing multiple layers. For example, the processors 118 determine one or more geometrical characteristics of a first segment 312 of the build part 302 and a second segment 332 of the build part 302. The first segment 312 is shown along the right side of the build part 302 in FIG. 7, and the second segment 332 is shown along the left side of the build part 302. The first triangular segment 312 is defined by three corners 323, 324, and 325 with known positional coordinates. The surface 310 of the first segment 312 is defined between three corners 323, 324, 325. The surface 336 of the second segment 332 is defined between three corners 333, 334, 335.

The geometrical characteristics of the segments include the angle of incidence relative to the electromagnetic energy source 106. For example, the first segment 312 defines an angle of incidence 318 relative to the energy source 106. The angle of incidence 318 is defined between a beam line 320 extending from the energy source 106 and a line 319 normal to the side surface 310 (e.g., skin) of the segment 312. The angle of incidence 318 is greater than the designated threshold (e.g., 90 degrees), so the surface 310 of the first segment 312 is classified as an outskin surface. The second segment 332 defines an angle of incidence 321 relative to the energy source 106, which is defined between a beam line 326 extending from the energy source 106 and a line 322 normal to the surface 336 (e.g., skin) of the segment 332. The angle of incidence 321 is less than the designated threshold (e.g., 90 degrees), so the surface 336 of the second segment 332 is classified as an inskin surface. The processors 118 may determine the respective angle of incidence for each of the partitioned segments of the build part.

The geometrical characteristics of the of the segments optionally also include an angle of the respective surface relative to the upper surface 110 of the build platform 102, which indicates the tilt or lean of the respective segment relative to horizontal. The angle may be based on a tangent or plane of the surface. The tangent can be determined by the processors 118 based on the positional coordinates of the points along the surface, such as the coordinates of the corners 323, 324, 325 for the first segment 312.

In an embodiment, the determined geometrical characteristics of the segments (e.g., the segments 312 and 332) are used by the processors 118 to predict the quality of the segments if the build part is constructed at the candidate position. The quality of the segments can refer to a level of surface quality, sub-surface quality, and/or accuracy of the segment relative to the build plan. The processors may generate a quality score for each of the segments at the candidate position 304. With reference to the angle of incidence geometrical characteristic, surfaces that have angles of incidence (relative to the energy source) above a designated threshold angle may have a different quality score than angles of incidence below the designated threshold angle. For example, angles of incidence above the designated threshold angle may typically, although not necessarily, be associated with worse quality than surfaces having angles of incidence below the designated threshold. Thus, outskin surfaces are expected to have degraded accuracy, surface quality, and/or sub-surface quality relative to inskin surfaces. For example, outskin surfaces may be expected to have greater porosity and/or roughness than inskin surfaces. The quality score assigned to the segments indicates a level of quality predicted for each segment. In a simple embodiment, the quality scores may be binary such that the processors 118 assign segments with inskin surfaces as having good or satisfactory quality and segments with outskin surfaces as having degraded or unsatisfactory quality. In one or more other embodiments, the assignment of quality scores may be more dynamic. For example, the processors 118 can distinguish between two different surfaces based on differences in the angles of incidence, even if the surfaces are both classified as inskin or outskin. A first segment that has a determined angle of incidence relative to the energy source 106 of 40° may be scored with a higher quality than a second segment with a determined angle of incidence of 70°. For example, although both segments have angles of incidence less than 90°, the first segment with the smaller angle is expected to provide reduced variations in the melt pool (e.g., less risk of melt extensions forming on the surface), so is expected to have higher quality than the second segment.

In an embodiment, the processors 118 may input one or more of the geometrical characteristics as variables into one or more functions to determine the quality scores. Optionally, the one or more functions may include additional input variables that may affect surface quality, such as the type of powder or other source material, build parameters such as power, speed, beam diameter, beam pass separation, settings such as the direction the recoater arm moves in the AM instrument 101, the direction of gas flow through the AM instrument 101, and/or the like. The one or more functions may be based on simulations or predictive data modeling. In an embodiment, the functions can be derived from historical, experimental data that tests the effects of different variables on surface quality. For example, various experiments may be performed in which a multitude of test coupons are additively manufactured, where the only difference between the test coupons is the positioning of the test coupons relative to the beam emitter(s) of the additive instrument. For example, different coupons in the experiment may have different rotational angles about an axis, different tilt angles relative to the platform, and/or different locations on the platform. By observing and recording the resulting surface quality, sub-surface quality, and/or geometrical accuracy of the different coupons, data that correlates the quality to the positioning can be collected and stored in a database, such as a look-up table, mathematical model, or the like. The one or more functions may be derived based on this experimental data.

The quality score may be the output of the one or more functions. The surface quality score, as described herein, broadly represents a quantitative or qualitative measure of predicted part quality if the build part is additively manufactured at the candidate position 304 according to the simulated build parameters and settings. The surface quality score may be a quantitative value within a defined scale, such as a scale from one to ten (with ten representing the best surface quality), one to one hundred, or the like. Alternatively, the scale may be qualitative in nature, such as including a few defined classes. The classes in a non-limiting example can be binary, as described above, including "satisfactory" for inskin surfaces and "unsatisfactory" for outskin surfaces. The qualitative classes in another example can include additional classes such as "great quality", "good quality", "adequate quality", "poor quality," and "bad quality". The quality score for each segment may include multiple sub-scores, such as a different score for roughness, porosity, geometric accuracy, and/or the like. Based on various reasons (e.g., the intended use of the build part), one or more of the sub-factors may be more important than others, so the generation of the sub-scores can allow for selective optimization of the higher weighted sub-factors. After determining the quality scores for the segments, the processors 118 may store the quality scores in the memory 130, such that the quality scores are affiliated or associated with the candidate position 304. As stated above, the segments can represent various shapes and sizes, including individual layers of material deposited onto the build part. Segment sizes may be chosen so that any inskin/outskin transitions or surface quality score changes internal to an individual segment are below the resolution of the additive manufacturing process.

The quality scores are utilized to determine a position for the build part to improve the quality of the build part that is additively manufactured by the AM instrument 101 (shown in FIG. 1), relative to selecting the position of the build part by another process. In one or more embodiments, the processors 118 may calculate an overall position score associated with the candidate position 304. The overall position score is a metric that is based on a set of plural quality scores for different segments of the build part 302 at the candidate position 304. For example, the processors 118 may aggregate the individual quality scores of the segments to calculate the overall position score. In non-limiting examples, the overall position score may be a sum of the individual quality scores, an average of the individual quality scores, or another statistical representation of the set of quality scores associated with the candidate position 304. Optionally, the processors 118 may weight the quality scores of some segments greater than other segments. For example, a surface that is going to be machined afterwards would be less critical than a surface that must remain in the as-deposited state. Therefore, the processors 118 may apply a greater weight to the scores of the segments that define the surface that must remain in the as-deposited state. The weights may be adjusted by applying a weight modifier to the scores. The processors 118 may store the overall position score in the memory 130 or another storage device.

Figure 8:
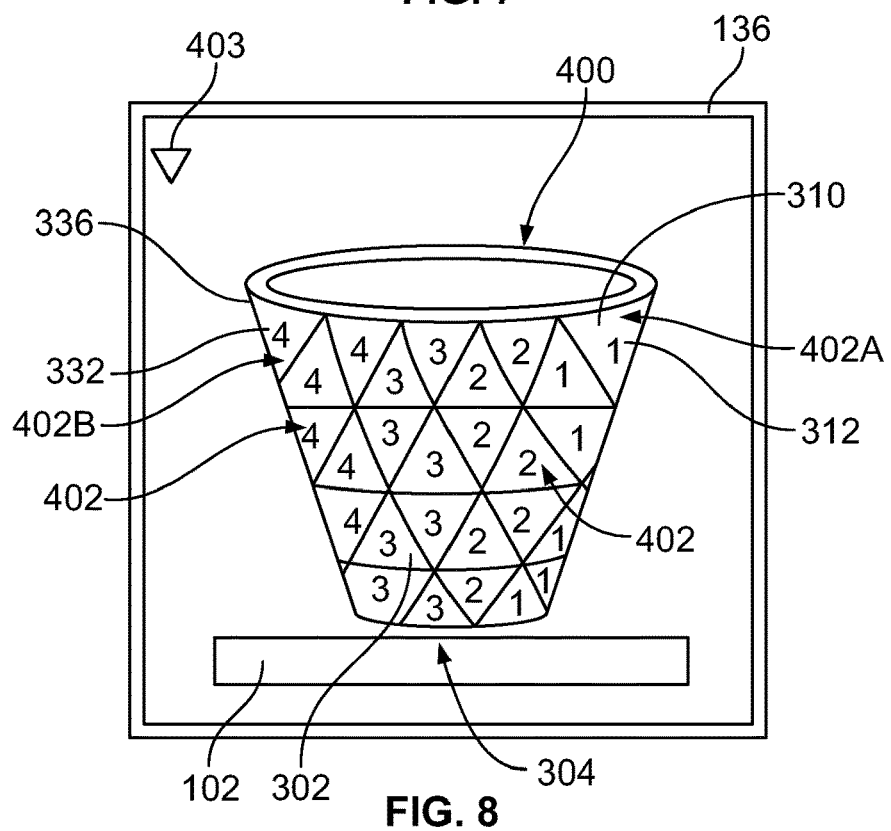
FIG. 8 illustrates a simulation model of the build part at a candidate position according to an embodiment.

The processors 118 may be configured to generate a simulation model of the build part 302 in the candidate position 304. FIG. 8 illustrates a simulation model 400 of the build part 302 at the candidate position 304 according to an embodiment. The simulation model 400 can be displayed as one or more images of the build part 302 with one or more graphic indicators 402 overlaid or superimposed on different segments of the build part 302. The simulation model 400 may be displayed on the output (e.g., display) device 136 to enable the operator of the AM system 100 to visualize the information presented on the simulation model 400. The simulation model 400 can include an indicator 403 that represents a general position of the electromagnetic energy source or beam emitter relative to the build part 302. The simulation model 400 includes a first graphic indicator 402A overlaid on the surface 310 of the first segment 312 and a second graphic indicator 402B overlaid on the surface 336 of the second segment 332. The graphic indicators 402 are representative of (e.g., are based on) the quality scores of the segments over which the graphic indicators 402 are located. For example, the first graphic indicator 402A on the first segment 312 represents the generated quality score for the first segment 312, and the second graphic indicator 402B on the second segment 332 represents the generated quality score for the second segment 332.

The graphic indicators 402 displayed on the simulation model 400 may be colors, numbers, letters, words, shapes, symbols, or the like. In the illustrated embodiment, the graphic indicators 402 are integer numbers from one to five. The integers represent different quality scores with five representing the class having the best predicted quality and one representing the class having the worst predicted quality relative to the other classes. For example, the first graphic indicator 402A is the number "1" and the second graphic indicator 402B is the number "4", which indicates that the surface 336 of the second segment 332 has a better projected quality than the surface 310 of the first segment 312 in the candidate position 304 of the build part 302. In another embodiment, the graphic indicators 402 may be color-coded such that high quality scores are green, low quality scores are red, and/or the like.

The simulation model is displayed on the display device 136 for viewing by the operator of the AM system 100. The simulation model 400 may be displayed as two-dimensional or three-dimensional. In an example in which the displayed simulation model 400 is three-dimensional, the simulation model 400 may be rotatable to view different selected sections of the simulation model 400. For example, an operator may utilize the input device 134 to spin the simulation model 400 to view surfaces that were previously obscured. By viewing the simulation model 400 the operator can see the predicted quality of different surfaces of the build part 302 in the candidate position 304. For example, the simulation model 400 presents areas that are predicted to have inferior or unsatisfactory surface quality. Based on the information received from the simulation model 400, an operator can decide to adjust the positioning of the build part relative to the AM instrument with the goal of improving the quality of the build part as deposited. The simulation model can be incorporated into a virtual reality platform and/or an augmented reality platform.

Figure 9:
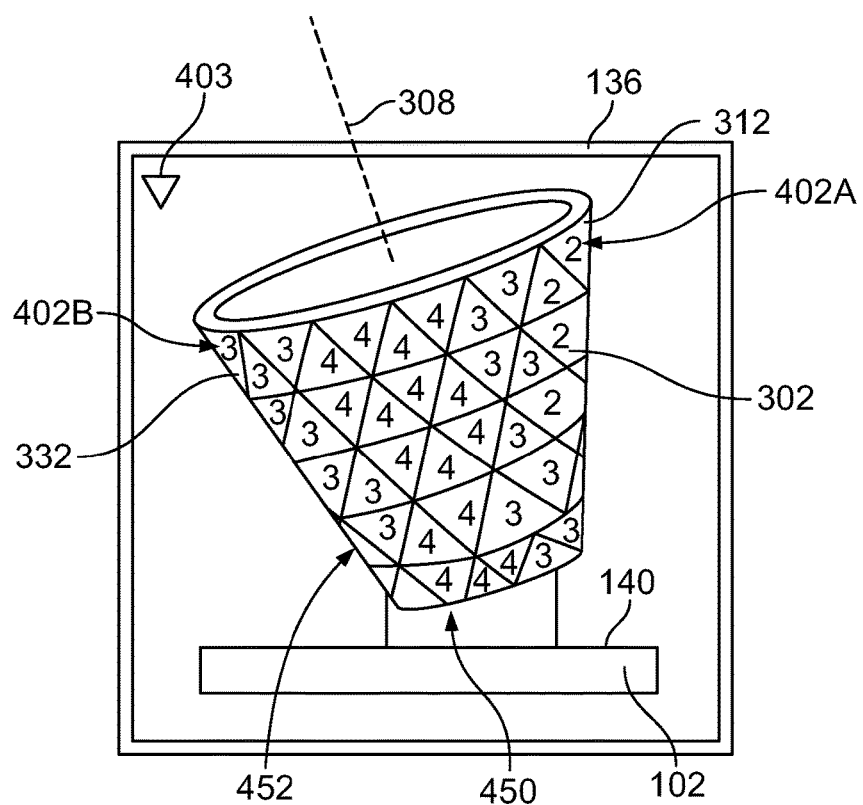
FIG. 9 illustrates a simulation model of the build part at a second candidate position according to an embodiment.

In response to viewing the simulation image, the operator may utilize the input device 134 to modify the position of the build part 302 relative to the platform 102. For example, the operator may input or select a second candidate position. The second candidate position may have a different location on the platform 102, a different rotational orientation, and/or a different tilt angle than the (first) candidate position 304. FIG. 9 illustrates a simulation model 450 of the build part 302 at the second candidate position 452 according to an embodiment. The build part 302 at the second candidate position 452 is tilted towards the location of the electromagnetic energy source, as identified by the indicator 403. For example, unlike the build part 302 in the candidate position 304 shown in FIG. 8, the longitudinal axis 308 of the build part 302 at the second candidate position 452 is not orthogonal to the upper surface 110 of the platform 102. The simulation model 450 can be generated and displayed on the output device 136.

In an embodiment, upon determining (e.g., receiving, selecting, calculating, or the like) the second candidate position, the processors 118 may repeat the process described above to determine a second set of quality scores for the various segments of the build part 302. The quality scores can be determined based on geometrical characteristics, including the angle of incidence relative to the energy source. The processors 118 may determine an overall position score for the build part 302 at the second candidate position. The second simulation model 450 may be generated based on the quality scores that are determined. The simulation model 450 may be concurrently displayed or, alternatively, consecutively displayed with the first simulation model 400 to enable the operator to compare the two simulation models. The processors 118 may store the details of the second candidate position, the second set of quality scores, the overall position score of the second candidate position, and the second simulation model in the memory 130 and/or in another storage device.

The system described herein allows for manual optimization of the build part positioning relative to the AM instrument. For example, based on a comparison between the information provided by the first and second simulation models (e.g., the overall position scores), the operator may utilize the input device 134 to select one or more additional candidate positions. At each additional candidate position, the processors 118 are configured to repeat the analysis to generate a new simulation model and/or a new overall position score. The simulation models enable the operator to comprehend the projected relationship between the positioning of the build part 302 and the predicted quality of the segments of the build part 302. If there is a particular surface area of a build part that the operator would like to have a certain threshold level of quality, then the operator can adjust the positioning of the build part 302 until a candidate position is reached in which the generated simulation model indicates that the predicted quality along that particular surface area satisfies the threshold. Similarly, the operator can keep modifying the candidate positions until a candidate position is discovered that results in an overall position score that is greater than a desired score threshold.

The system described herein may provide automated optimization of the build part positioning relative to the AM instrument. For example, the processors 118 may generate a recommended position for the build part based on an analysis of multiple candidate positions without utilizing operator input. The processors 118 may perform the analysis on an initial set of candidate positions to determine simulation models and/or overall position scores for each of the candidate positions in the initial set. Then the processors 118 can select one or more preferred candidate positions from the initial set that have better results (e.g., higher overall position scores) than other candidate positions. Optionally, the processors 118 may generate additional candidate positions based on the results of the initial analyses, and at least some of the preferred candidate positions may be generated by the processors 118. The processors 118 may select the best preferred candidate position as a recommended position to use during the actual build process. Alternatively, the processors 118 may present the preferred candidate positions to the operator, such as the top three candidate positions, to enable the operator to decide which of the preferred candidate positions to select for the build process.

The operator can be involved in the automated candidate position determination process. For example, the operator can specify specific segments of the build part which require higher quality and/or specific segments that do not require any quality optimization. The operator input can be represented by adjusting weights associated with different portions of the build part. For example, the weights associated with segments requiring higher quality can be increased, and the weights associated with segments that do not require quality optimization can be decreased. The operator can also use the input device to specify a range of locations/orientations that are desired. For example, the operator may want to avoid large melt areas (to prevent residual stress build-up in the part) and/or may want a specific surface to be within a specific location and/or orientation window. The processors 118 can analyze the predicted quality of the build part at the different candidate positions based on these operator-input constraints or parameters.

In an embodiment, the processors 118 may select the recommended position based on the overall position scores of the candidate positions that have been analyzed and stored. For example, the processors 118 may select, as the recommended position, the candidate position that is associated with the highest overall position score of the stored overall position scores associated with the specific build part 302. In another embodiment, the processors 118 may function as a solver algorithm to essentially "solve for" the position of the build part 302 that provides the greatest possible surface quality according to the scoring system disclosed herein. For example, the processors 118 may perform a multitude of calculations by varying different variables to focus in on a single candidate position that is predicted to provide improved surface quality over at least some other potential positions of the build part on the platform. In a non-limiting example, the processors 118 may iteratively change one variable at a time to establish a large set of different candidate positions, and then may systematically generate a respective overall position score for each of the candidate positions in the set. In another non-limiting example, the processors 118 may "smartly" select the candidate positions to test based on learned trends, such as a trend that surfaces leaning towards the energy source 301 would be expected to have better surface quality than surfaces leaning away from the energy source 301.

In the illustrated embodiment, the system predicts that building the build part at the second candidate position 452 would result in better overall quality of the build part than building the build part at the first candidate position 304 shown in FIGS. 7 and 8. For example, the graphic indicators 402 overlaid or superimposed on different segments of the build part 302 in the simulation model 450, in the aggregate, have higher scores or numbers than the aggregated graphic indicators 402 of the simulation model 400. Tilting the build part 302 towards the energy source is predicted to improve the overall surface quality of the surfaces by making the surfaces more uniform across the perimeter of the build part. For example, tilting the build part 302 reduces some of the angles of incidence of lines extending from the energy source to the surfaces of the segment. For example, the graphic indicator 402A on the first segment 312 is a "2" in the simulation model 450, which represents an improvement over the "1" shown in the simulation model 400. The increased quality score may be attributable, at least in part, to a reduced angle of incidence between the skin or surface 310 of the first segment 312 and a line extending from the energy source. Although the overall quality score may be improved, tilting the build part can results in an increased angle of incidence of some segments, which may reduce the individual quality score for those segments. For example, the quality score graphic indicator 402B for the second segment 332 has decreased from "4" in the simulation model 400 to a "3" in the simulation model 450, which may be based in part on an increased angle of incidence.

Optionally, in addition to, or instead of, adjusting the orientation of the build part 302, different candidate positions may have different locations of the build part 302 on the platform 102. For example, the processors 118 may recommend a candidate position that is closer to the energy source than another candidate position. Moving the build part closer to the energy source may improve the quality of various segments of the build part due to altered angles of incidence of energy beams from the energy source that impinge upon the build part.

The operator may utilize the input device 134 to select or confirm a finalized position of the build part 302. The finalized position can be a preferred position generated by the processors 118 or a position selected by the operator based on the simulation models, overall position scores, and/or other information presented by the system to the operator. Once the position is finalized, the processors 118 can generate the build plan 132 (shown in FIG. 1) based on the finalized position of the build part. Then, the AM instrument 101 can be controlled to additively manufacture a physical build part according to the build plan 132, such that the build part is constructed in a location and orientation that matches the finalized position.

Figure 10:
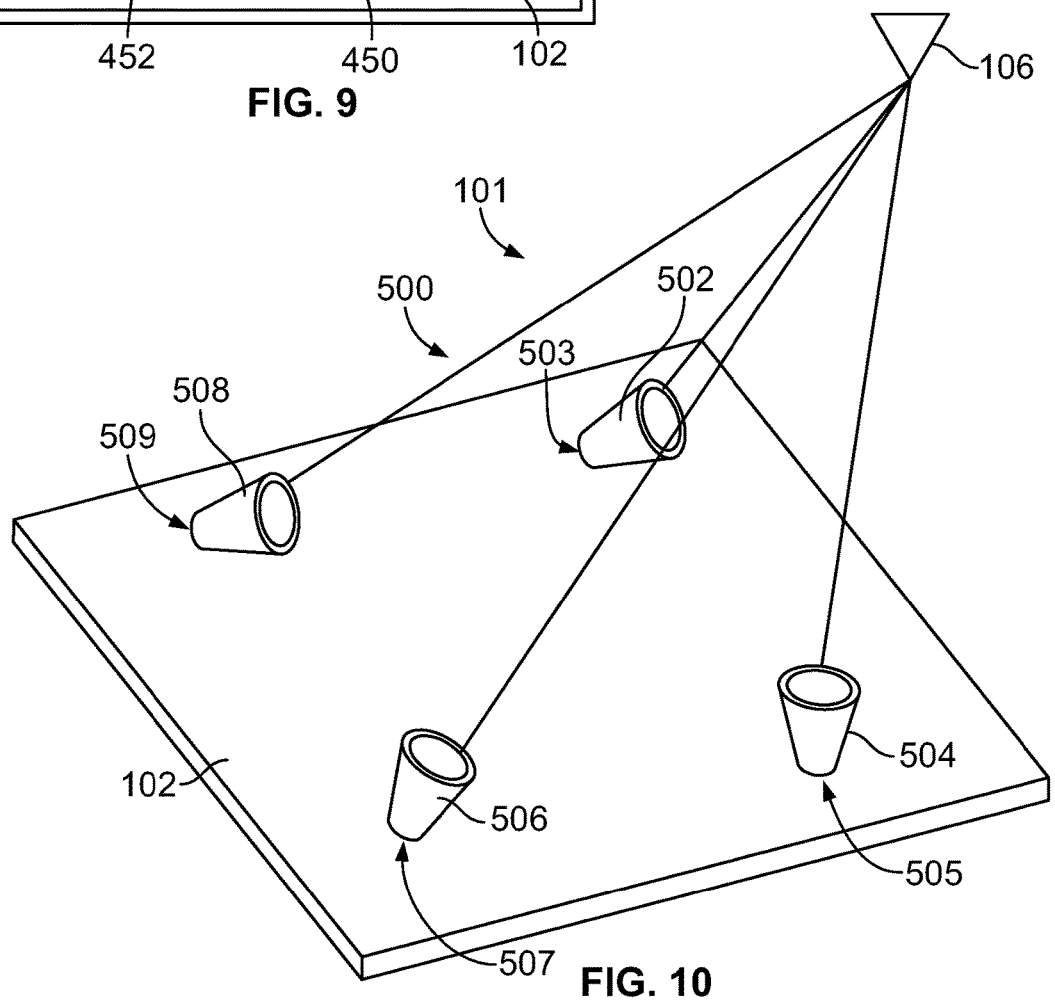
FIG. 10 illustrates an array of multiple build parts arranged at different locations on the build platform of the additive manufacturing instrument according to an embodiment.

The system 100 can also be utilized to plan the positioning of multiple build parts to be concurrently manufactured on the same platform during a single additive manufacturing build process. FIG. 10 illustrates an array 500 of multiple build parts arranged at different locations on the build platform 102 of the AM instrument 101 according to an embodiment. The build parts include a first part 502 at a first location 503, a second part 504 at a second location 505, a third part 506 at a third location 507, and a fourth part 508 at a fourth location 509. In an embodiment, the locations 503, 505, 507, 509 may be fixed (e.g., set), and the processors 118 perform the quality analysis on various candidate positions of the build parts 502, 504, 506, 508 by modifying the tilt and rotation of the build parts 502, 504, 506, 508 to define the different candidate positions. The processors 118 may determine one or more preferred candidate positions for each of the build parts 502, 504, 506, 508 based on the analysis. For example, the preferred candidate positions may involve the build parts 502, 504, 506, 508 being tilted towards the location of the energy source 106, similar to the tilt of the part 302 shown in FIG. 9.

The processors 118 may be configured to determine if any of the build parts 502, 504, 506, 508 are unable to satisfy a minimum quality threshold. The minimum quality threshold may be designated based on a standard or a use requirement or may be selected by operator input. For example, the processors 118 may compare the overall quality scores for each preferred candidate position of the multiple build parts 502, 504, 506, 508 to the minimum quality threshold. In a non-limiting example, the third build part 506 may be the only build part in the array 500 that fails to satisfy the minimum quality threshold. For example, none of the candidate positions of the third build part 506 result in an overall quality score that meets or exceeds the minimum quality threshold. As a result, the processors 118 may provide a notification to the operator that the third build part 506 should not be constructed at the set position 507. The notification may be provided via the output device 106, such as a displayed message. In response, the processors 118 may determine another location for the build part 506 on the platform 102 for evaluation and/or the operator may decide to initiate the build process to build only the first, second, and fourth parts 502, 504, 508.

In another embodiment, the processors 118 may determine the locations of the build parts 502, 504, 506, 508 on the platform 102 in addition to the rotation and tilt of the build parts 502, 504, 506, 508. For example, the processors 118 may arrange the build parts 502, 504, 506, 508 on the platform 102 in a polar array in which the build parts 502, 504, 506, 508 surround the energy source 106 and tilt towards the energy source 106.

Figure 11:
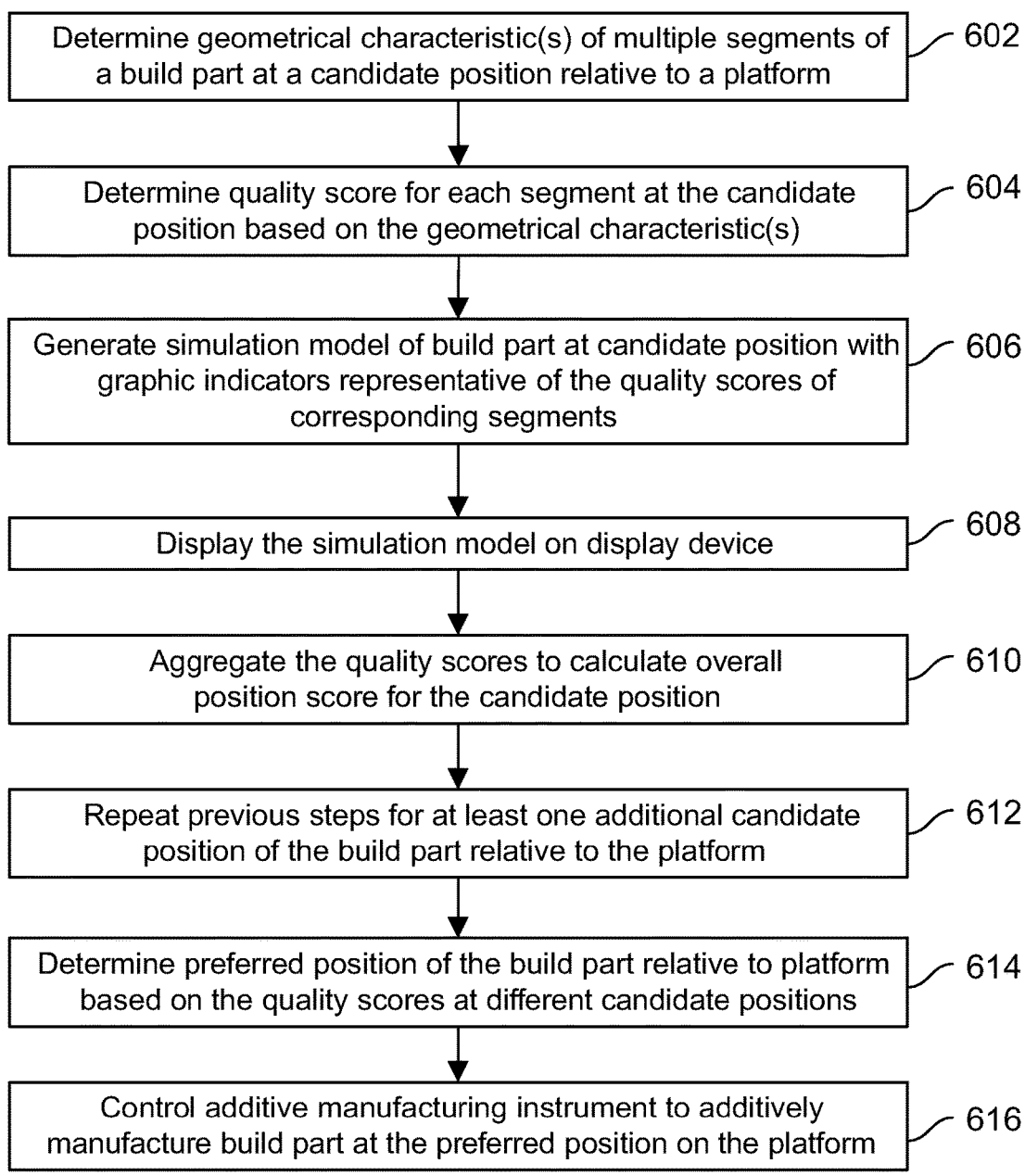
FIG. 11 is a flow chart of a method of simulating surface quality of an additively manufactured build part according to an embodiment of the present disclosure.

FIG. 11 is a flow chart of a method 600 of simulating surface quality of an additively manufactured build part according to an embodiment of the present disclosure. The method 600 is configured to predict the surface quality of various segments of a build part prior to additively manufacturing the build part. The predicted surface quality may enable selectively positioning the build part during an actual additive build process to improve the surface quality of the manufactured build part relative to the surface quality that would be achieved at a different position of the build part within the manufacturing instrument. The method 600 may be performed in whole, or at least in part, by the one or more processors 118 of the control unit 108 of the AM system 100 shown in FIG. 1. Optionally, some operator input can be provided in one or more of the steps. Optionally, the method 600 may include more steps than shown in FIG. 11, fewer steps than shown in FIG. 11, different steps that are not shown in FIG. 11, and/or a different arrangement or order of the steps than shown in FIG. 11.

The method 600 begins at 602, at which one or more geometrical characteristics of each of multiple segments of a build part are determined at a candidate position of the build part relative to a platform. The one or more geometrical characteristics include an angle of incidence between a beam line extending from an electromagnetic energy source of an additive manufacturing instrument and a surface normal of a respective skin of the corresponding segment proximate to the beam line.

At 604, a quality score for each of the segments of the build part at the candidate position are determined based on the one or more geometrical characteristics. Segments of the build part with lower angles of incidence may have higher quality scores than segments of the build part with greater angles of incidence. At 606, a simulation model of the build part at the candidate position is generated. The simulation image includes graphic indicators corresponding to each of the segments. The graphic indicators are representative of the quality scores of the corresponding segments. At 608, the simulation model is displayed on a display device for viewing by an operator. At 610, the quality scores of the segments of the build part at the candidate position are aggregated to calculate an overall position score for the candidate position.

At 612, the previous steps (e.g., 602, 604, 606, 608, and 610) are repeated at least once at another candidate position of the build part relative to the platform. After multiple cycles, the method may have data including segment quality scores, simulation models, and overall position scores for multiple candidate positions of the build part. At 614, at least one preferred position of the build part relative to the platform is determined based on the data at the different candidate positions. The preferred positions may be determined for achieving improved quality of the build part relative to additively manufacturing the build part at non-preferred candidate positions, such as the initial candidate position. At 616, an additive manufacturing instrument is controlled to additively manufacture the build part at one of the preferred positions on the platform. The build part may automatically select the preferred position at which the build part is additively manufactured based on the overall quality score or another metric. Alternatively, an operator may select the preferred position at which the build part is additively manufactured from multiple preferred positions that are provided to the operator as choices.

One or more embodiments described herein use information about the shape of the build part and the location of the build part within the build envelope of the additive manufacturing instrument to predict surface quality of various segments of the build part prior to actually forming the physical build part. For example, the embodiments described herein may simulate part surface roughness for use in selecting an optimal or preferred part orientation and location within the machine build envelope. The simulation data that is generated can be used in a placement optimization algorithm or solver algorithm to provide a recommended position of the build part in the machine build envelope.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 108 shown in FIG. 1. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 108, or the one or more processors 118 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 108 shown in FIG. 1 is configured to execute a set of instructions that are stored in one or more storage elements (such as one or more memories), in order to process data. The set of instructions includes various commands that instruct the control unit 108 (e.g., the processor(s) 118 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:
one or more processors configured to determine one or more geometrical characteristics of each of multiple segments of a build part at a candidate position of the build part relative to a platform, wherein the one or more geometrical characteristics of each of the segments include an angle of incidence between a beam line extending from an electromagnetic energy source of an additive manufacturing instrument and a surface normal of a respective skin of the corresponding segment proximate to the beam line, the electromagnetic energy source configured to emit electromagnetic energy beams in different directions along multiple beam lines to fuse designated portions of the build part at a single location of the electromagnetic energy source relative to the additive manufacturing instrument and the build part,
wherein the one or more processors are configured to generate a quality score for each of the segments at the candidate position based on the one or more geometrical characteristics.

2. The additive manufacturing system of claim 1, further comprising a display device operably connected to the one or more processors, the display device configured to display graphic indicators corresponding to the segments, wherein the graphic indicators represent the quality scores of the corresponding segments.

3. The additive manufacturing system of claim 2, wherein the graphic indicator comprises one or more of a color, a number, or a symbol.

4. The additive manufacturing system of claim 1, wherein the one or more processors are configured to generate a simulation model of the build part at the candidate position for display, the simulation model including graphic indicators corresponding to each of the segments, the graphic indicators representative of the quality scores of the corresponding segments.

5. The additive manufacturing system of claim 1, wherein the one or more processors are configured to determine one or more preferred positions of the build part relative to the platform for achieving improved quality of the build part relative to additively manufacturing the build part at the candidate position.

6. The additive manufacturing system of claim 5, wherein the one or more processors are configured to determine the one or more preferred positions of the build part based on which positions of the build part result in a greater reduction in the angles of incidence of the segments relative to the angles of incidence of the segments at the candidate position.

7. The additive manufacturing system of claim 5, wherein, at the one or more preferred positions of the build part, a longitudinal axis of the build part is tilted towards the electromagnetic energy source of the additive manufacturing instrument.

8. The additive manufacturing system of claim 5, wherein, in response to receiving a selection of one of the one or more preferred positions as a finalized position of the build part relative to the platform, the one or more processors are configured to control the additive manufacturing instrument to construct the build part at the finalized position of the platform by sequentially depositing material in layers.

9. The additive manufacturing system of claim 1, wherein the one or more processors are further configured to aggregate the quality scores of the segments to calculate an overall position score associated with the candidate position.

10. The additive manufacturing system of claim 9, wherein the candidate position is a first candidate position and the one or more processors are further configured to generate quality scores for the multiple different segments of the build part at a second candidate position of the build part on the platform based on the one or more geometrical characteristics of the segments at the second candidate position, the build part at the second candidate position having at least one of a different location, tilt, or rotational orientation relative to the build part at the first candidate position, wherein the one or more processors are configured to aggregate the quality scores of the segments to calculate an overall position score associated with the second candidate position, and rank the first and second candidate positions based on the overall position scores of the first and second candidate positions.

11. The additive manufacturing system of claim 1, further comprising an input device operably connected to the one or more processors, wherein the one or more processors are configured to receive the candidate position of the build part on the platform responsive to operator commands provided using the input device.

12. The additive manufacturing system of claim 1, wherein the electromagnetic energy source comprises a scanning head configured to direct the electromagnetic energy beams in the different directions along the multiple beam lines without moving the electromagnetic energy source relative to the additive manufacturing instrument or the build part.

13. A method comprising:
   determining one or more geometrical characteristics of each of multiple segments of a build part at a candidate position of the build part relative to a platform, wherein the one or more geometrical characteristics of each of the segments include an angle of incidence between a beam line extending from an electromagnetic energy source of an additive manufacturing instrument and a surface normal of a respective skin of the corresponding segment proximate to the beam line;
   determining a quality score for each of the segments at the candidate position based on the one or more geometrical characteristics, wherein segments of the build part with lower angles of incidence have higher quality scores than segments of the build part with greater angles of incidence; and
   generating a simulation model of the build part at the candidate position for display, the simulation image including graphic indicators corresponding to each of the segments, the graphic indicators representative of the quality scores of the corresponding segments.

14. The method of claim 13, further comprising displaying the simulation model of the build part on a display device.

15. The method of claim 13, further comprising determining one or more preferred positions of the build part relative to the platform for achieving improved quality of the build part relative to additively manufacturing the build part at the candidate position.

16. The method of claim 15, further comprising controlling the additive manufacturing instrument to additively manufacture the build part at one of the one or more preferred positions on the platform.

17. The method of claim 13, further comprising aggregating the quality scores of the segments to calculate an overall position score associated with the candidate position.

18. The method of claim 17, further comprising:
   determining quality scores for the multiple different segments of the build part at a second candidate position of the build part on the platform based on the one or more geometrical characteristics of the segments at the second candidate position, the build part at the second candidate position having at least one of a different location, tilt, or rotational orientation relative to the build part at the candidate position;
   aggregating the quality scores of the segments to calculate an overall position score associated with the second candidate position; and
   ranking the first and second candidate positions based on the overall position scores of the first and second candidate positions.

19. The method of claim 13, wherein the electromagnetic energy source is configured to emit electromagnetic energy beams in different directions along multiple beam lines to fuse designated portions of the build part at a single location of the electromagnetic energy source relative to the additive manufacturing instrument and the build part, the beam lines used to determine the angles of incidence of the segments.

20. An additive manufacturing system comprising:
   one or more processors configured to determine one or more geometrical characteristics of each of multiple segments of a build part at a candidate position of the build part relative to a platform, the one or more geometrical characteristics include an angle of incidence between a beam line extending from an electromagnetic energy source of an additive manufacturing instrument and a surface normal of a respective skin of the corresponding segment proximate to the beam line, the electromagnetic energy source configured to emit electromagnetic energy beams in different directions along multiple beam lines to fuse designated portions of the build part at a single location of the electromagnetic energy source relative to the additive manufacturing instrument and the build part, wherein the one or more processors are configured to determine a quality score for each of the segments at the candidate position based on the one or more geometrical characteristics such that segments of the build part with lower angles of incidence have higher quality scores than segments of the build part with greater angles of incidence, and wherein the one or more processors are configured to compare the quality scores of the segments at the candidate position to determined quality scores of the segments of the build part at other candidate positions to provide one or more preferred positions of the build part for achieving improved quality of the build part by additively manufacturing the build part at one of the one or more preferred positions relative to additively manufacturing the build part at the candidate position.

* * * * *